US008174684B2

(12) United States Patent
Brossette et al.

(10) Patent No.: US 8,174,684 B2
(45) Date of Patent: May 8, 2012

(54) MODULAR MEASURING HEAD SYSTEM

(75) Inventors: Frank Brossette, Schmelz (DE); Norbert Steffens, Überherrn (DE)

(73) Assignee: Leica Geosystems AG, Heerbrugg (CH)

( * ) Notice: Subject to any disclaimer, the term of this patent is extended or adjusted under 35 U.S.C. 154(b) by 295 days.

(21) Appl. No.: 12/589,250

(22) Filed: Oct. 20, 2009

(65) Prior Publication Data

US 2010/0157288 A1 Jun. 24, 2010

Related U.S. Application Data

(63) Continuation-in-part of application No. PCT/EP2008/002305, filed on Mar. 22, 2008.

(30) Foreign Application Priority Data

Apr. 21, 2007 (DE) ......................... 10 2007 018 951

(51) Int. Cl.
*G01N 21/00* (2006.01)

(52) U.S. Cl. ......................................... 356/72; 356/498

(58) Field of Classification Search .................... 356/72, 356/498, 496

See application file for complete search history.

(56) References Cited

U.S. PATENT DOCUMENTS 7,430,068 B2 * 9/2008 Becker et al. ................ 358/511
2005/0141052 A1 6/2005 Becker et al.
2010/0312524 A1 * 12/2010 Siercks et al. ................... 703/1

FOREIGN PATENT DOCUMENTS

DE 44 45 331 A1 6/1998
DE 10 2005 018 168 A1 10/2006
DE 197 47 027 A1 10/2009
EP 1 059 609 A3 12/2000

* cited by examiner

*Primary Examiner* — Layla Lauchman
(74) *Attorney, Agent, or Firm* — Maschoff Gilmore & Israelsen

(57) ABSTRACT

In a modular measuring head system comprising a central module having the shape of a parallelepiped block with six sides, the central module encloses an interior space and is provided on at least five sides with attachment sites, each having at least one opening leading to the interior space. Together with additional modules, the central module forms a modular building structure based on a highly diverse optical measuring head including at least several of an illumination module, a lens module, a mirror module and a camera module. Each of these optional modules can be at least indirectly attached to at least one of the attachment sites.

15 Claims, 7 Drawing Sheets

34 33 1 32 13 11 3 29 8 26 27 30 28 31

34
1
30
32
40
29
3
11
26
31
28

34
44
1c
40
3
11
26b
30

MODULAR MEASURING HEAD SYSTEM

This is a continuation-in-part application of pending international patent application PCT/EP2008/002305 filed Mar. 22, 2008 and claiming the priority of German patent application 10 2007 018951.8 filed Apr. 21, 2007

BACKGROUND OF THE INVENTION

The invention relates to an optical modular measuring head system, in particular, for measuring machines.

Measuring machines comprising an optical measuring head that may solve several measuring problems are known. In this respect, reference is made, for example, to document DE 38 06 686 A1. The measuring machine disclosed therein comprises a measuring head that operates not only as an imaging-type video sensor but also accommodates a laser sensor in order to perform dotwise measurements in z-directions.

Furthermore, this measuring machine comprises a mechanical sensor supported on a separate z-spindle sleeve, said sensor also being able to perform measuring tasks.

As a rule, the optical measuring head is set up to perform only a specific type of measurement or image capture. For example, the retrofitting of interferometric measuring methods to imaging modes and non-interferometric measurements, as a rule involves—if at all possible—retrofitting of the measuring head.

It is the principal object of the present invention to provide a measuring head capable of performing desired measurements in a rapid and efficient manner.

SUMMARY OF THE INVENTION

In a modular measuring head system comprising a central module having the shape of a parallelepiped with six sides, the central module encloses an interior space and is provided on at least five sides with attachment sites, each having at least one opening leading to the interior space. Together with additional modules, the central module forms a modular building structure based on a highly diverse optical measuring head including at least several of an illumination module, a lens module, a mirror module and a camera module. Each of these optional modules can be at least indirectly attached to at least one of the attachment sites.

Additional modules and auxiliary elements including for example cover caps, cover plates, intermediate rings, intermediate pieces, tubes and the like may be provided, whereby these also belong to the modular measuring head system. The defined attachment sites of the central module where the other modules may be attached are selected for a specific measuring task, the modular measuring head system may be implemented as, e.g., an imaging measuring head with annular light illumination, an imaging measuring head with lens illumination, a laser measuring head, a measuring head displaying a fixed imaging scale, a measuring head with a continuous or stepped variable imaging scale, and the like. This is achieved based on the building-block or modular principle, based on which the respectively required or desired other modules are mounted to the central block-shaped module.

Preferably, the attachment sites of the central module are configured in such a manner that various other modules can be attached to the specific attachment site. In the ideal case, the attachment sites are configured uniformly so that a great variability concerning the assembly of the individual modules and their spatial arrangement is achieveable.

The central module encloses an interior space that represents intersecting optical paths for the optical components that are to be attached, i.e., the modules that are to be attached. Preferably, the openings are configured in such a manner that their central axes intersection at right angles in a central point. Optionally, additional openings and attachment sites may be provided on the central module, whereby the central axes of said openings and attachment sites intersect in an additional central point. These conditions ensure that the various optical components, regardless of how they are attached to the central module, will always cooperate correctly with one another.

The modular measuring head is intended for an optical coordinate measuring device. This head comprises at least one optical sensor in the form of a camera module, for example. In addition, one or more optically imaging modules belong to the modular measuring head system in order to be able to generate two-dimensional images. The central module is suitable for the attachment of a coaxial illumination unit that consists of an illumination module. This is preferably a module into which the required light is coupled by means of fiber optics. Thus, the heat input is kept low. Alternatively, the illumination module may be provided with an LED for light generation. Without making structural changes to the central module, it is possible—in a simple manner—to accomplish various adaptations by adding, removing or interchanging other modules. For example, a coaxial illumination unit may be attached in that light is mirrored into the measuring path of the lens by means of a mirror module and the illumination module. Other illumination modules such as, for example, an annular light module enclosing the lens may be installed or uninstalled. Additional sensors or sensor elements such as, for example, a laser-based distance sensor or other optical dot sensors for the detection of the height level of a lens point may be provided. Likewise, other detector modules, for example, additional camera modules, may be provided, these being different from the first detector module (camera module) in that they display a different imaging scale, for example.

An actuator, for example a piezo actuator, may be provided on the modular measuring head in order to perform a deep scan with the lens that is configured as an interferometric lens, for example.

In addition, a haptic sensor may be attached to the modular measuring head.

Furthermore, the modular measuring head may comprise an optical dot sensor. This may be designed as a chromatographic confocal sensor or as a sensor based on an interferometric measuring principle.

Additional details of advantageous embodiments of the invention are the subject matter of the drawings or the description or the claims. The description is restricted to particular aspects of the invention and to certain features. The drawings show additional details that supplement the description.

DETAILED DESCRIPTION OF THE MEASURING HEAD

Figure 1:
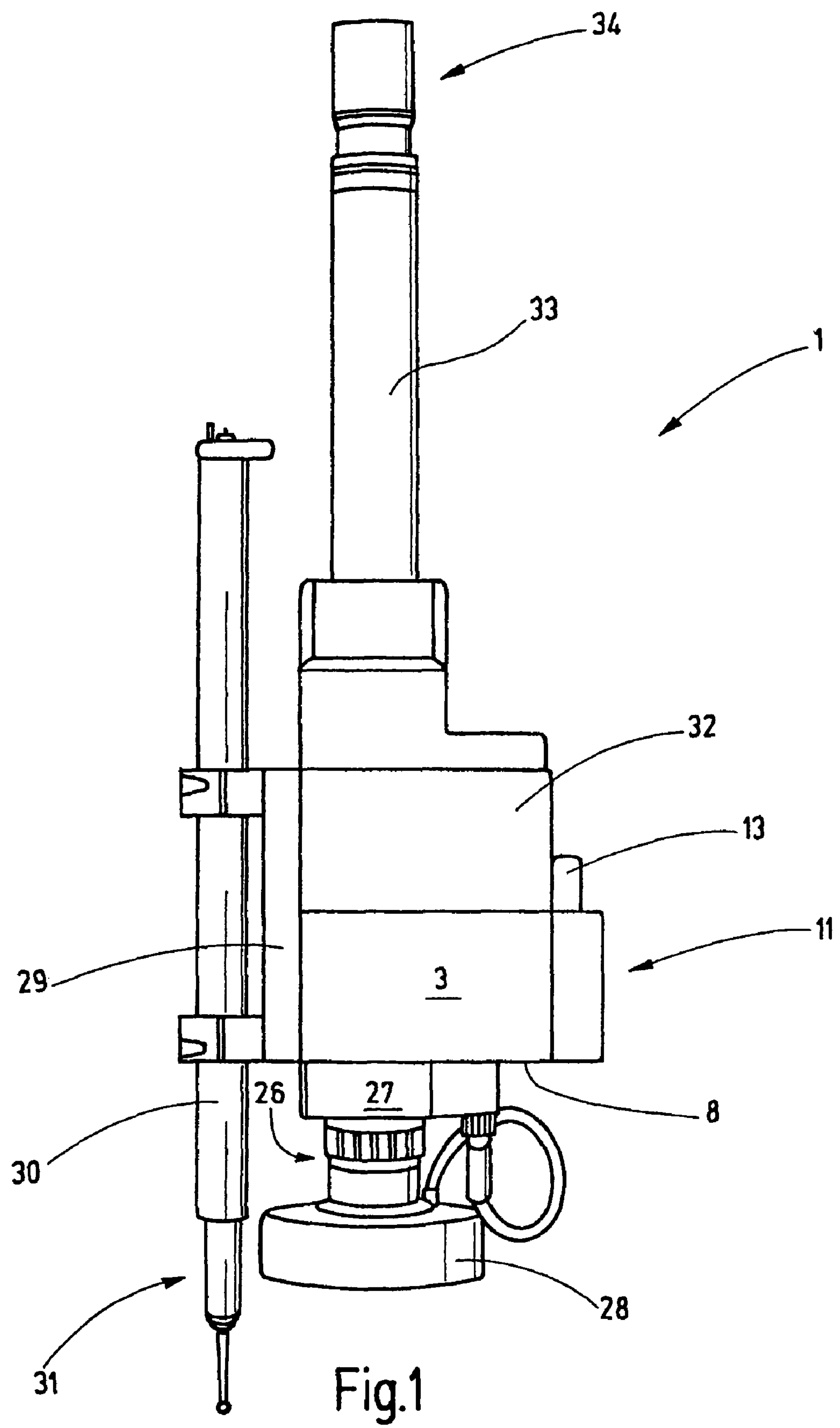
FIG. 1 is a front view of a measuring head designed on the basis of the inventive modular measuring head system.
Figure 2:
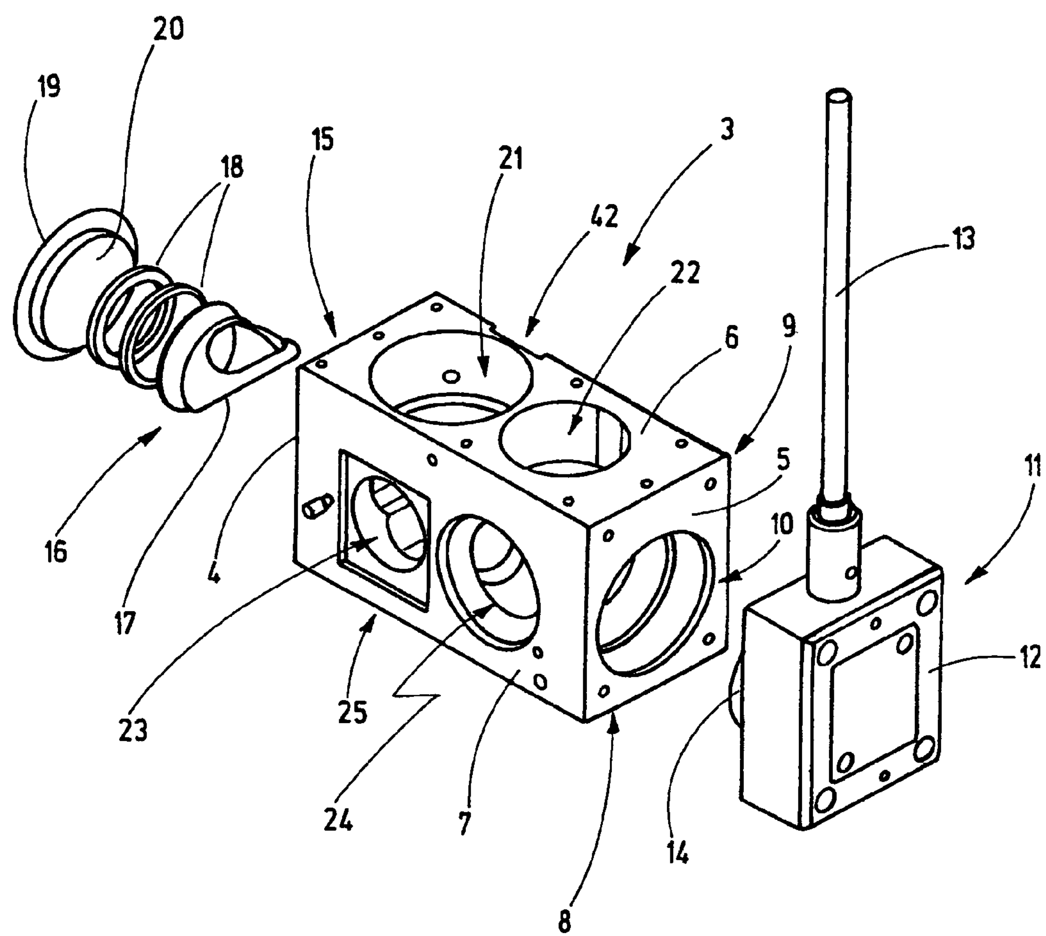
FIG. 2 is a perspective view of the central module of the measuring head in accordance with FIG. 1, comprising an illumination module and a mirror module.
Figure 10:
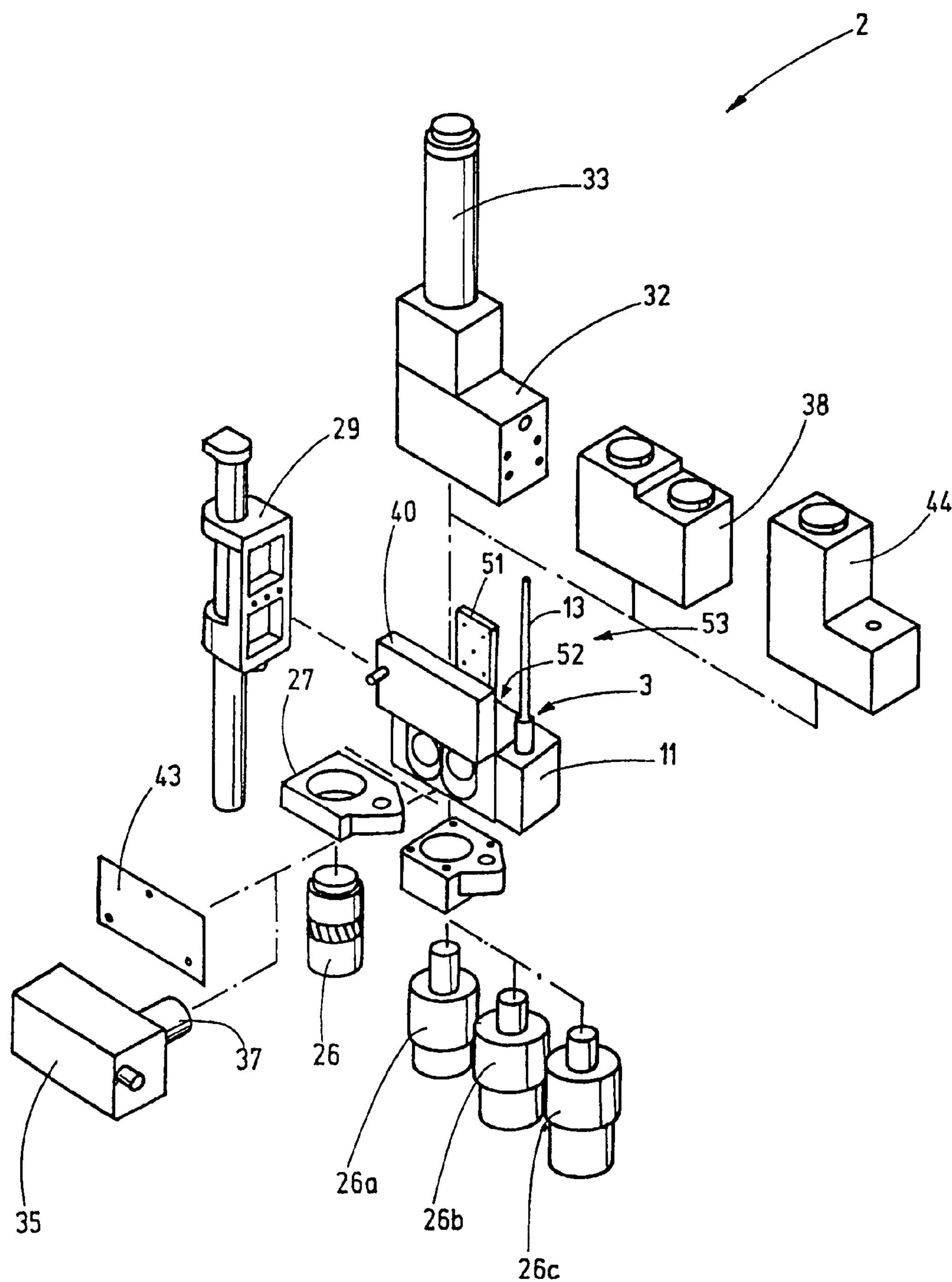
FIG. 10 is a perspective exploded view of the modular measuring head system showing the various components of the measuring head.

FIG. 1 shows an optical measuring head 1 which is constructed in a modular manner on the basis of a modular measuring head system 2 (FIG. 10). FIG. 10 shows the general arrangement of said system. The modular measuring head system 2 comprises various modules that can be assembled in a variety of combinations. The basis of each combination is a central module 3, as shown by FIG. 2. This central module is a six-sided parallelepiped that has small sides 4, 5 and large sides 6, 7, 8, 9. Each of the opposing smaller sides 4, 5 has attachment sites with a central large opening whose central axes are in alignment with each other. An attachment site 10 for an illumination module 11 is provided on the surface 5. This module comprises a preferably rectangular housing 12 that is supplied with light via a light-conducting fiber or a light-conducting cable 13. For the alignment of the housing 12 on the central module 3, it is possible to provide suitable alignment means, for example in the form of a tube extension 14 that fits into the opening of the attachment site 10.

An attachment site 15 is also provided on the opposite small side 4, said site potentially acting as a receptacle for various optical components. In the present example, said site is set up for the accommodation of a mirror module 16 with a semi-permeable mirror 17. This mirror is arranged at a 45-degree angle relative to the central axis of the opening representing the attachment site 15. The mirror module 16 is associated with intermediate rings 18 and a closing disk 19 that has, on its inward-facing side, a light-absorbing surface 10 that acts as a light trap, for example.***

Furthermore, the central module 3 has, on its upper, large side 6, an attachment site 21 that includes an opening whose central axis intersects at a right angle with the central axes of the attachment sites 10 and 15. Next to the attachment site 21, there may be provided another opening 22 that is oriented parallel to the opening 21 and whose central axis preferably also intersects the central axis of the attachment sites 10, 15. The opening 22 may act as the attachment site for an optical component or, e.g., merely for the accommodation of projections of another component. Such projections may be, for example, the servomotor of a zoom drive.

The vertical, front, large side 7 has one or more attachment sites 23, 24 that are preferably parallel to each other, said sites being represented by openings whose central axes intersects the central axis of the attachment sites 10, 15. In addition, the central axis of the attachment site 23 preferably intersects the central axis of the attachment site 21 at the same time.

In alignment with the attachment site 21, the lower, large side 8 of the central module 3 is provided with another attachment site 25 whose central axis coincides with the central axis of the attachment site 21. This site is used for the installation of a lens, for example.

Now, reference is made to FIG. 1. It illustrates a measuring head displaying a particularly simple design on the basis of the central module 3. Attached to the lower, large side 8 is a lens module 26 that has a preferably cylindrical neck for the support of an attachment piece 27. The lens module 26 receives light via the mirror module 16 that cannot be seen in FIG. 1 and the illumination module 11. In addition, the attachment piece 27 may support an annular illumination module 28 that may be used, for example, for the illumination of dark areas. In addition to the mirror module, the attachment site 15 supports a support module 29 with a support tube 30 that is provided with a mechanical sensor 31, for example, a control sensor.

A zoom module 32 is attached to the flat, upper, large side 6 of the central module 3, said zoom module optionally supporting on its upper side—via a tube 33—a camera module 34.

The measuring head 1 may be used to measure the surface of a workpiece by tactile and optical means. For optical surface measurement, the optical imaging system consisting of the lens module 26, the zoom module 32 and the camera module 34 is used. For illumination, either the annular illumination module 28 and/or the illumination module 11 are provided, unless the mirror module 16 is provided in the optical path.

Figure 3:
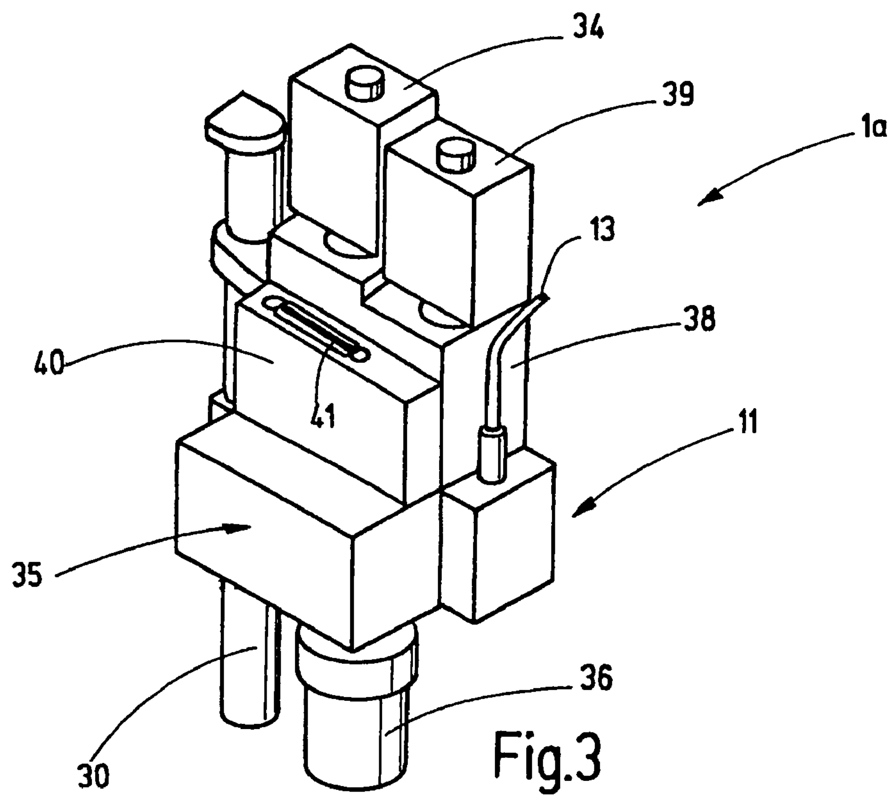
FIGS. 3 to 9 are perspective views of various measuring heads assembled on the basis of the inventive modular measuring head system.

FIG. 3 illustrates a modified measuring head 1*a* on the basis of the central module 3, said measuring head being completely hidden by additional components in FIG. 3. To the extent that already explained components are present and identical components are designated by the same reference numerals, reference is made to the previous description. In FIG. 3, the lens module 26 is covered by a laser autofocus module 35 that is attached to the large side 7. Its laser 36 extends in downward direction parallel to the lens. As is shown by FIG. 10, the laser 36 projects light by means of a semi-permeable mirror 37, and, optionally, via the mirror module 16, into the optical path of the lens module 26.

Instead of the zoom module 32, a stepwise zoom module 38 is provided on the upper side 6 of the central module 3, the stepwise zoom module—starting from the attachment side 21—splitting the optical path into two parallel optical paths by means of a semi-permeable mirror and a completely reflective mirror. Of these two paths, one leads to the camera module 34 and the other leads to an additional camera module 39, both said camera modules being arranged parallel to each other on the upper side of the stepwise zoom module 38. The two camera modules 34, 39 are preferably electronic pixel-type cameras using different chip sizes and/or different numbers of pixels. They work simultaneously and thus produce image signals simultaneously, so that it is possible to make a rapid selection by electronic means between the two camera modules 34, 39 and thus switch the enlargement or even record image signals in a parallel manner. For supplementary disclosure, reference is made to document DE 19514498 A1.

In addition, the stepwise zoom module 38 may also support an electrical connection module 40 with a connector 41. Preferably, this connector is a multi-pin connector, by means of which electrical power can be supplied to the measuring head 1*a*, for example, for energizing LED groups of the annular illumination module 28. Furthermore, if the zoom module 32 is provided instead of the stepwise zoom module 38, the drives of the zoom module 32 can be controlled via the connector 41. In order to forward electrical signals from the connection module 40 to the other assemblies, the central module 3—as is shown in FIG. 2—comprises, on its rear side 9, a cable channel 42 that is configured, for example, as a flat groove.

Figure 4:
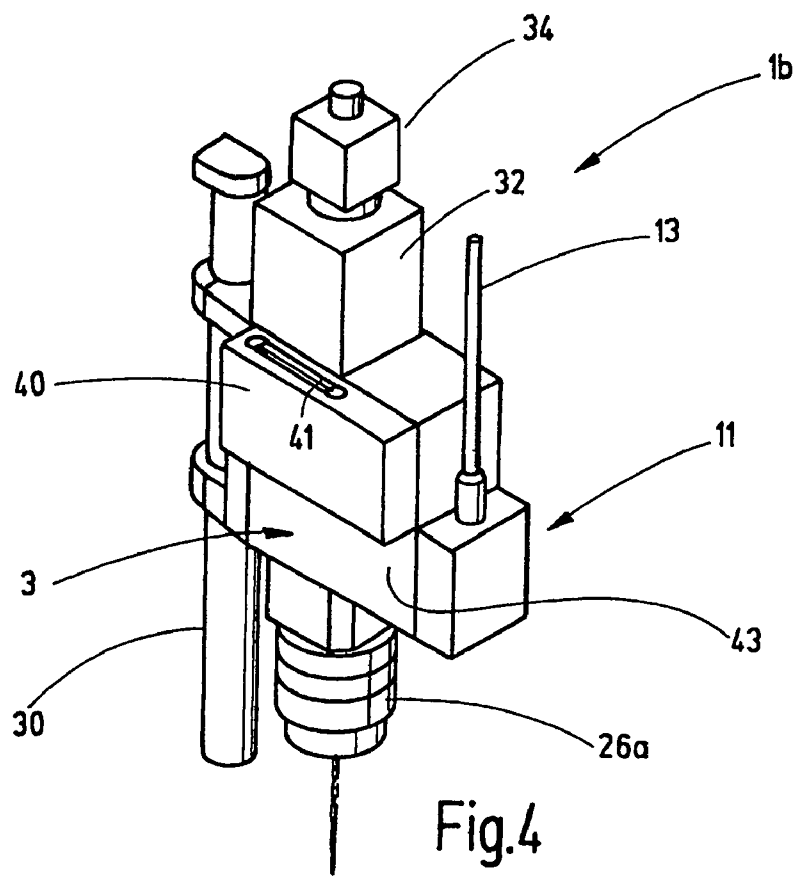

FIG. 4 shows another combination of the modules to provide a measuring head 1*b*. To the extent that already described modules and elements are used, and making reference to the already mentioned reference signs, reference is made to the previous description. A lens 26*a* having a fixed focal length is being used. On its front side, the central module 3 is provided with a cover plate 43. It covers the attachment site 24 and the attachment site or the inspection opening, or the cleaning opening 23.

Figures 5, 6:
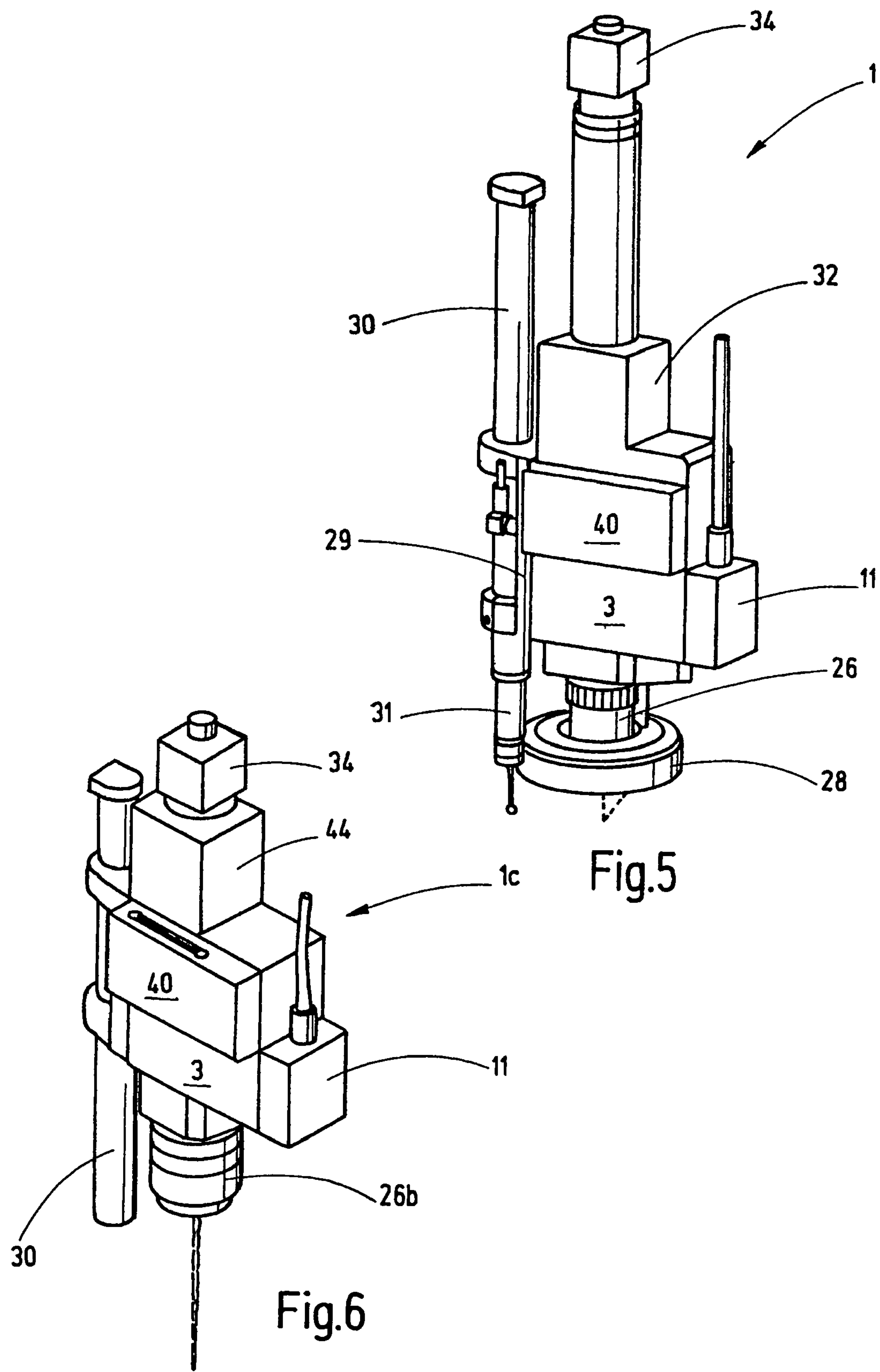

FIG. 5 is another perspective view illustrating the measuring head 1 in accordance with FIG. 1.

FIG. 6 shows a variant design of an optical measuring head 1*c* without zoom based on the embodiment of FIG. 4. The camera module 34 is attached directly to the fixed lens 26*b*. An intermediate module 44 is arranged between the camera module 34 and the central module 3. The intermediate module 44 contains no adjustable optical components or no optical elements at all. Other than that, the previous description applies analogously.

Figure 7:
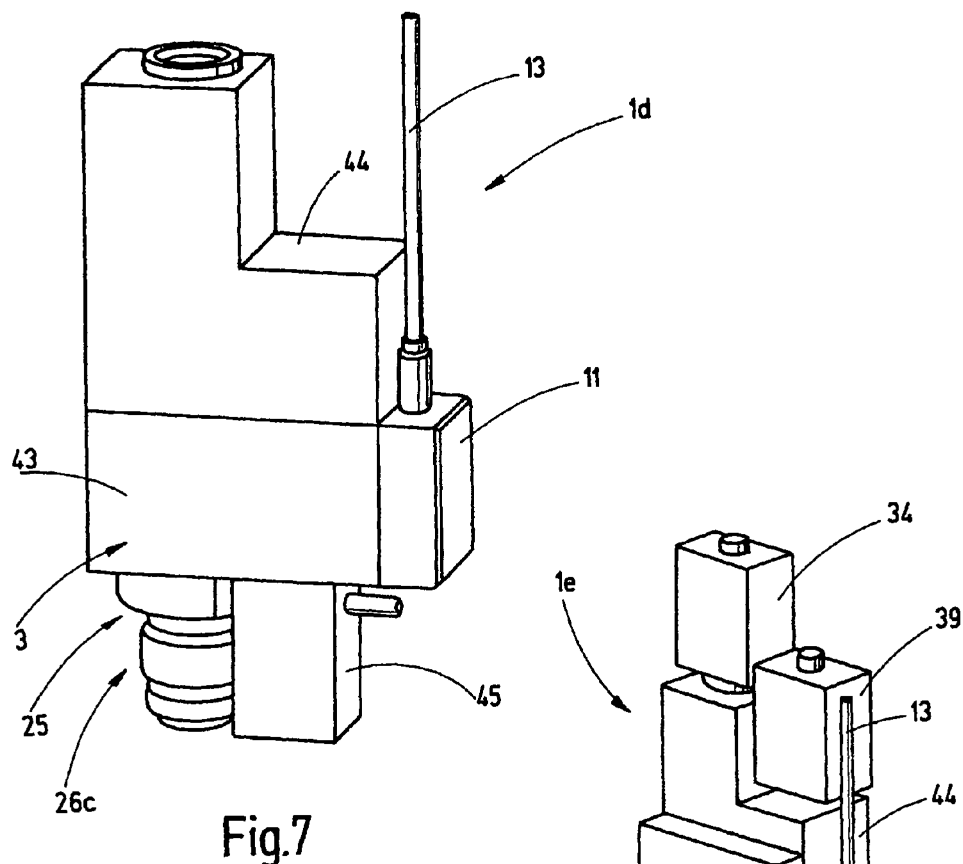

FIG. 7 shows another modification. A piezo adjustment module 45 is attached to the central module 3 that is provided on the front side with the cover plate 43, said central module supporting, on its attachment site 25, an optical interferometry lens 26*c*, for example, a Mirau lens. Said piezo adjustment module is disposed to adjust the lens 26, for example, at a step-width of 50 nanometers and a rate of 50 steps per second, for example. An active movement of the lens (of the lens system) can be achieved with the piezo adjustment module 45. High measuring accuracies can be achieved with this measuring head 1*d*.

Figure 8:
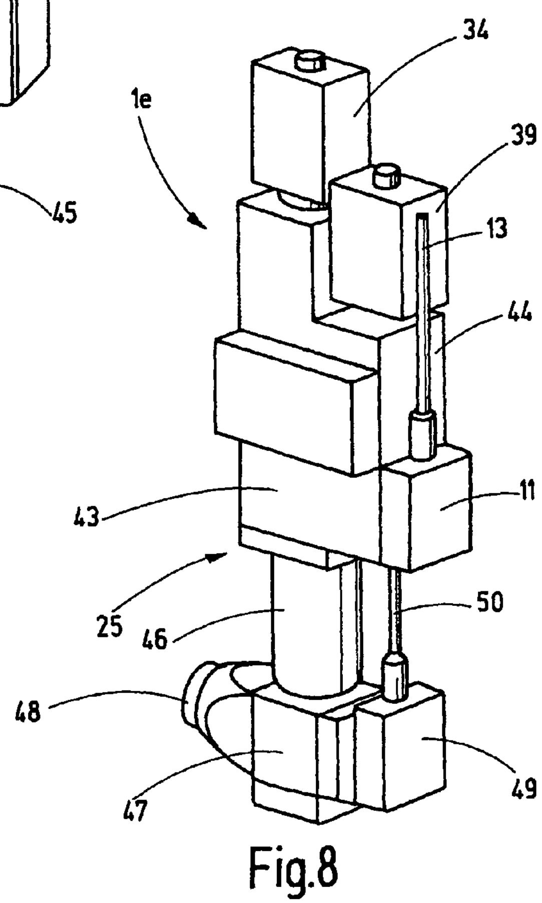

FIG. 8 shows a measuring head 1*e* that can be used for the simultaneous recording of optical interference images as well as for picture images. To the extent that already described components are used, reference is made to the previous description. With the use of the modular measuring system, it is possible to implement a measuring arrangement in accordance with document DE 102004022341 A1.

Via a tube 46, a beam splitter housing 47 is attached to its lower attachment site 25, whereby a reference optical path with a reference mirror 48 branches off said beam splitter housing. On the opposite side, a white light illumination unit 49 is arranged, whereby said illumination unit can be supplied with light via a light-wave conductor 50. Furthermore, said unit may contain a polarizing filter. A $\lambda/4$-plate may be arranged in the reference optical path. Polarizing filters may also be provided in the intermediate module 44 in order to guide light displaying one polarization to the camera module 34 and light displaying the other polarization to the camera module 39. In this manner, an interference image may be recorded with one camera module and a live image of the examined object may be recorded with the other camera module. The two camera modules 34, 39 can be used to record interference images, whose difference produces the live image, on the one hand, and the difference image, on the other hand.

Figure 9:
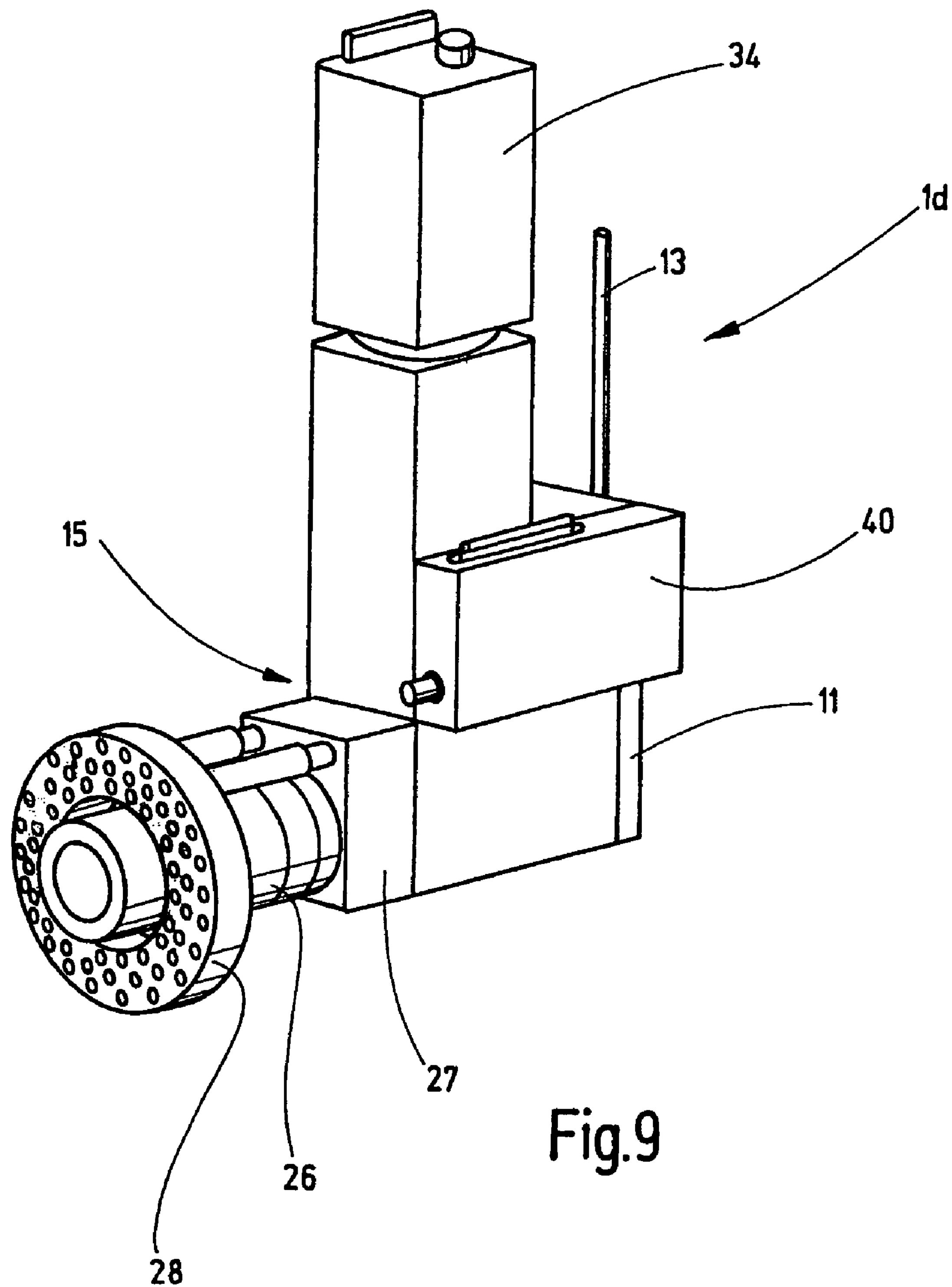

FIG. 9 shows another combination of the described modules in the form of a measuring head 1*d*. Considering this, the lens 26 is attached to the attachment piece 27, and the annular light module 28 is attached to the lateral attachment site 15. The lower attachment side 25 is closed by a cover plate.

FIG. 10 shows a number of the described modules and elements to illustrate alternative assembly combination options. The rear side (side 9) of the central module 3 preferably has no larger openings, and thus no attachments for other modules are provided. The rear side is used for the attachment of the central module 3 to a guide element such as, for example, a measuring machine. For attachment, it is possible to use a dove-tail metal sheet 51 that, together with a dove-tail groove 52, forms a mounting device 53 for mechanically mounting the central module to a mechanical support. Preferably, the dove-tail grove is provided on the rectangular, large side 9 in the center parallel to the short edges.

A modular measuring head system 2 is being suggested, said system comprising at least one central module 3 that has the shape of a parallelepiped with six sides 4, 5, 6, 7, 8, 9. Said central module encloses an interior space and has, on at least five sides 4, 5, 6, 7, 8, attachment sites 10, 15, 21, 24, 25, each circumscribing at least one opening leading to the interior space. Together with additional modules, the central module 3 forms a modular building kit to create the most diverse optical measuring heads. Such modules may be an illumination module 11 and/or a lens module 26 and/or a mirror module 16 and/or a camera module 34. Each of these optional modules can be at least indirectly attached—optionally by interposing another module—to at least one of the attachment sites 10, 15, 21, 24, 25.

REFERENCE SIGNS

1 Measuring head
2 Modular measuring head system
3 Central module
4, 5 Small sides
6, 7, 8, 9 Large sides
10 Attachment sites
11 Illumination module
12 Housing
13 Light-conducting cable
14 Tube extension
15 Attachment site
16 Mirror module
17 Mirror
18 Intermediate rings
19 Disk
20 Surface
21 Attachment site
22 Opening
23 Attachment site/cleaning opening
24, 25 Attachment sites
26 Lens module
27 Attachment piece
28 Annular illumination module
29 Holding module
30 Holding tube
31 Mechanical Sensor
32 Zoom module
33 Tube
34 Camera module
35 Laser autofocus module
36 Laser
37 Mirror
38 Stepwise zoom module
39 Camera module
40 Connection module
41 Connector
42 Cable channel
43 Cover plate
44 Intermediate module
45 Piezo adjustment module
46 Tube
47 Beam splitter housing
48 Reference mirror
49 Illumination unit
50 light-wave conductor
51 Dove-tail metal sheet
52 Dove-tail groove
53 Mounting device

What is claimed is:

1. A modular measuring head system comprising a measuring head including:

a central module having the shape of a parallelepiped block with six sides and enclosing an interior space, at least five sides including attachment sites that circumscribe openings leading into the interior space;

an illumination module for attachment to at least one of the attachment sites;

a lens module mounted to at least one of the attachment sites;

a mirror module mounted to at least one of the attachment sites;

a camera module mounted to at least one of the attachment sites; and the central module including a mechanical mounting device by means of which the measuring head is configured to be mounted to a mechanical support.

2. The modular measuring head system in accordance with claim 1, wherein the openings have central axes and are arranged in such a way that the central axes of two openings provided on different sides intersect.

3. The modular measuring head system in accordance with claim 2, wherein all the central axes intersect in one of at most two points.

4. The modular measuring head system in accordance with claim 1, wherein the central module has four large and two small sides.

5. The modular measuring head system in accordance with claim 4, wherein at least one of the four large sides has two openings.

6. The modular measuring head system in accordance with claim 4, wherein the large sides are twice as large as the small sides.

7. The modular measuring head system in accordance with claim 1, further comprising a motorized zoom module attached to a side of the central module.

8. The modular measuring head system in accordance with claim 7, wherein the motorized zoom module comprises an attachment site for the camera module, said attachment site for the camera module matching the corresponding attachment site provided on the central module.

9. The modular measuring head system in accordance with claim 7, wherein, in addition to the motorized zoom module, an intermediate module is provided, said intermediate module having mechanical connections matching those of the motorized zoom module so that the intermediate module and the zoom module are interchangeable.

10. The modular measuring head system in accordance with claim 8, wherein, additionally, an electrical connection module is provided.

11. The modular measuring head system in accordance with claim 10, wherein the electrical connection module is attached to the motorized zoom module.

12. The modular measuring head system in accordance with claim 1, wherein the central module contains a cable channel.

13. The modular measuring head system in accordance with claim 12, wherein the cable channel is arranged on the side of the central module on which the mounting device is provided.

14. The modular measuring head system in accordance with claim 1, wherein the central module is provided with a holding device for a mechanical sensor.

15. The modular measuring head system in accordance with claim 1, wherein, in the form of the mounting device, the central module defines a single mechanical systems interface; that, by means of the electrical connection module, said mounting device defines an electrical systems interface; and, due to the attachment sites and optionally the illumination module said mounting device defines an optical systems interface.

* * * * *